United States Patent [19]

Lee et al.

[11] 4,313,114

[45] Jan. 26, 1982

[54] LIQUID LEVEL RECORDER APPARATUS AND METHOD FOR STORING LEVEL DIFFERENCES IN MEMORY

[75] Inventors: Harold G. Lee; Indra K. Bishnoi, both of Portland, Oreg.

[73] Assignee: Leupold & Stevens, Inc., Beaverton, Oreg.

[21] Appl. No.: 154,673

[22] Filed: May 30, 1980

[51] Int. Cl.³ .................... G08G 19/16; G08G 25/04
[52] U.S. Cl. .................... 340/870.23; 235/92 CA; 340/870.02; 340/870.16; 340/870.42; 340/347 P; 340/347 SH
[58] Field of Search .................... 340/870.16, 870.42, 340/870.43, 870.21, 870.2, 870.19, 347 SH, 347 M, 870.22, 870.23, 870.24; 375/26; 235/92 CA, 92 DC, 92 CP; 73/312, 313; 364/556; 346/14 R, 17

[56] References Cited

U.S. PATENT DOCUMENTS

| | | |
|---|---|---|
| 2,082,038 | 6/1937 | West et al. |
| 2,092,298 | 9/1937 | Bauer |
| 2,143,597 | 1/1939 | Gilles et al. |
| 2,922,994 | 1/1960 | Kennedy ............ 340/332 |
| 3,087,030 | 4/1963 | Shebanow ............ 200/87 |
| 3,246,517 | 4/1966 | Malkiewicz |
| 3,264,560 | 8/1966 | Cheney |
| 3,364,466 | 1/1968 | Stine ............ 340/147 R |
| 3,511,410 | 5/1970 | Leining ............ 222/45 |
| 3,522,596 | 8/1970 | Fowler et al. |
| 3,686,631 | 8/1972 | Elliott |
| 3,769,594 | 10/1973 | Wawra et al. ............ 328/151 |
| 3,935,741 | 2/1976 | Zinsmeyer et al. ............ 73/313 |
| 4,006,413 | 2/1977 | Silberberg ............ 324/102 |
| 4,008,405 | 2/1977 | Neumann et al. ............ 307/231 |
| 4,053,840 | 10/1977 | Baron ............ 328/151 |
| 4,065,968 | 1/1978 | Sunagawa ............ 73/313 |
| 4,135,137 | 1/1979 | Thomas ............ 335/206 |
| 4,141,065 | 2/1979 | Sumi et al. ............ 340/347 SH |

Primary Examiner—James J. Groody
Attorney, Agent, or Firm—Klarquist, Sparkman, Campbell, Leigh, Whinston & Dellett

[57] ABSTRACT

A shaft position recorder apparatus and method are described which can be used for recording changes in liquid levels. The recorder employs an electronic memory for storing the changes in liquid levels which are entered into the memory at predetermined time intervals if they exceed a predetermined magnitude or "deadband". The recorder apparatus employs a shaft position encoder as an input means for supplying a group of pulses for each measured change in shaft position or liquid level so that the sequence of the pulses indicates whether the change was an increase or decrease from the previous reading. The preferred shaft encoder includes three reed switches which are operated by four permanent magnets mounted on a support disk which rotates in accordance with the position of the shaft, such shaft being coupled to a float pulley when used as a liquid level recorder. The reed switches are closed in different sequences when the support disk is rotated in opposite directions to produce the groups of pulses on three parallel outputs connected to a computer for analysis to determine if level change is up or down; and to produce a present level signal. The recorder contains a temporary or scratch pad memory which stores a datum reference signal corresponding to the previously measured liquid level signal. This datum reference signal is compared with the present level signal to produce a difference level signal corresponding to the differences in their amplitude which is then compared with a predetermined deadband limit signal to produce an output difference level signal when it exceeds such deadband. The output difference level singal is periodically gated every 15 minutes to a permanent memory where it is stored and is also transmitted to the datum memory to update the datum reference signal. In addition, the recorder includes a maximum level memory and minimum level memory which continuously monitor the present level signal, temporarily store and transmit maximum and minimum level signals through gates to the permanent memory at the end of a predetermined time period such as every 24 hours.

15 Claims, 4 Drawing Figures

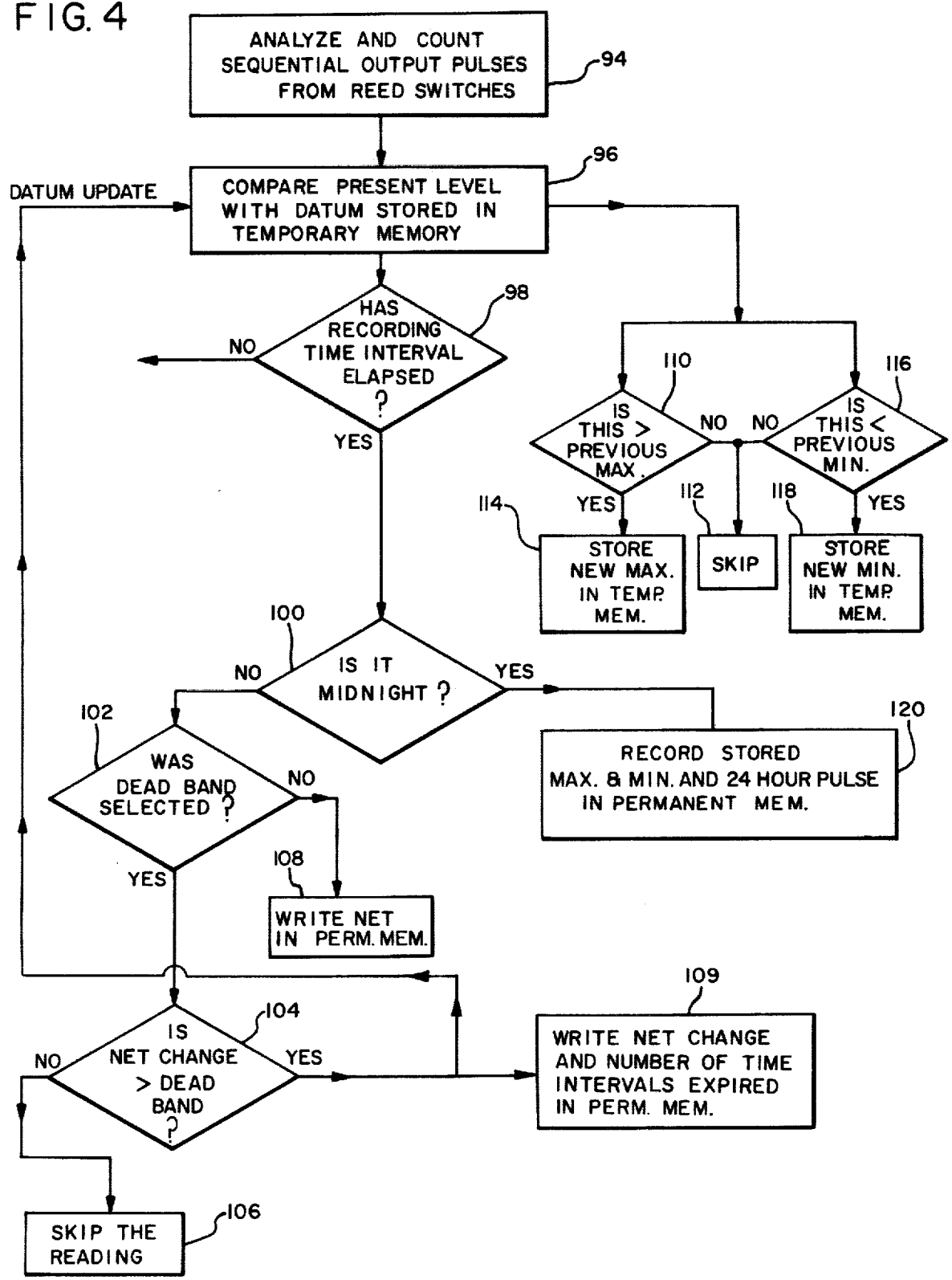

4,313,114

LIQUID LEVEL RECORDER APPARATUS AND METHOD FOR STORING LEVEL DIFFERENCES IN MEMORY

BACKGROUND OF INVENTION

The present invention relates generally to shaft position recorder apparatus and method, and in particular, to such recorder apparatus and method employing an electronic memory to store a difference signal corresponding to a change in shaft position which is periodically gated into such memory if such difference signal exceeds a predetermined amount or "deadband". The shaft position recorder of the present invention is especially useful for recording the change in liquid levels, such as water levels of rivers, and indicating whether the change in water level is up or down from the previous measured level. The recorder includes a shaft position encoder to produce a group of electrical pulses for each measured change in shaft position or liquid level with the sequence of the pulses in each group indicating whether the change was an increase or decrease from the previous reading. As a result of recording only difference signals exceeding a predetermined deadband, the recorder of the present invention operates more efficiently so it can employ a memory of small storage capacity to accurately record the changes in shaft position and the direction of such change. In addition, the recorder includes a maximum memory and a minimum memory which continuously monitor the shaft position signal and temporarily store the maximum and minimum position signal which are gated to the permanent memory at the end of a predetermined time period, such as 24 hours.

Previously it has been proposed in U.S. Pat. No. 2,082,038 of West et al, to provide a liquid level recording system which transmits an electrical signal corresponding to the liquid level from a remote location to a relay operated level indicator using a shaft position encoder and float to produce such signal. The shaft encoder is in the form of a cam wheel having two sets of cams which operate a pair of switches to cause them to transmit pulses of different polarity to the recorder to indicate a rise or fall of the liquid level by the sequence of such pulses. Unlike the recorder of the present invention, this prior apparatus does not employ a periodically gated memory for storing a difference signal corresponding to the difference between successively measured liquid levels. Also it does not employ a memory for recording the maximum and minimum levels produced during a predetermined time period. Further, the shaft encoder of West differs from that of the present invention in that the switches are not magnetically actuated by a polarity of magnets and does not employ three switches which are operated in different sequence to indicate a rise or fall of the liquid level.

Previously it has been suggested in U.S. Pat. No. 4,008,405 of Neumann et al, to provide an electronic weighing system including a motion detector which detects motion and inhibits the production of an output weight signal when such motion exceeds predetermined limits. This motion detector compares the analog input signal at the output of an integrator with the stored prior input signal to produce a difference signal which is compared with reference signals to produce a motion signal which inhibits the output weight signal when the difference signal exceeds the reference signals. Unlike the present invention there is no difference output signal corresponding to a change in liquid level or shaft position which is periodically recorded in a gated permanent memory. Also the reference signals are not stored in a datum memory which is updated after each reading. Furthermore, there is no shaft position encoder for producing pulses and pulse analyzer to determine from the sequence of such pulses whether the change in level is up or down from the previous level in the manner of the present invention.

Also it has previously been proposed in U.S. Pat. No. 2,922,994 of Kennedy to provide a shaft position encoder signal generator employing a polarity of magnetically actuated reed switches which are operated by magnets attached to a support rotated by a shaft. However, this encoder is a high-speed analog to digital converter and is not used as the input of a liquid level recorder to indicate the direction of change in level by the sequence of the pulses in the manner of the present invention.

SUMMARY OF INVENTION

It is therefore one object of the present invention to overcome the disadvantages of the above described prior patents and to provide an improved recorder apparatus and method of more efficient operation.

Another object of the present invention is to provide such a recorder apparatus and method in which only the difference between two measured values of a variable quantity is stored in a periodically gated permanent memory thereby reducing the required size of the memory.

A further object of the invention is to provide such a recorder apparatus and method in which the measured value signal of the previous reading is stored and compared with the present measured value signal to produce a difference signal which is then compared with a deadband reference signal to produce a difference output signal only when the difference signal exceeds such deadband, thereby reducing the amount of information which is required to be stored in the permanent memory.

An additional object of the present invention is to provide a liquid level recorder apparatus and method in accordance with the above characteristics.

Still another object is to provide such a water level recorder which can be located at a remote position and can be left unattended for long periods of time while permanently recording changes in liquid level in a memory.

A still further object of the invention is to provide such a liquid level recorder apparatus having a shaft position encoder which supplies a group of electrical pulses for each measured change in liquid level so that the sequence of such pulses indicates whether such change was up or down from the previous level in a simple, accurate manner.

Another object of the present invention is to provide such a liquid level recorder which also continuously monitors the present level signal for changes in the maximum level and minimum level and temporarily stores maximum and minimum level signals during a predetermined time period at the end of which such signals are gated into a permanent memory.

DRAWINGS

Other objects and advantages of the present invention will be apparent from the following detailed description of the preferred embodiments thereof and from the attached drawings of which:

FIG. 4 is a flow diagram of the operation logic steps used in a digital computer programmed in accordance with the method of the present invention.

DESCRIPTION OF PREFERRED EMBODIMENTS

Figure 1:
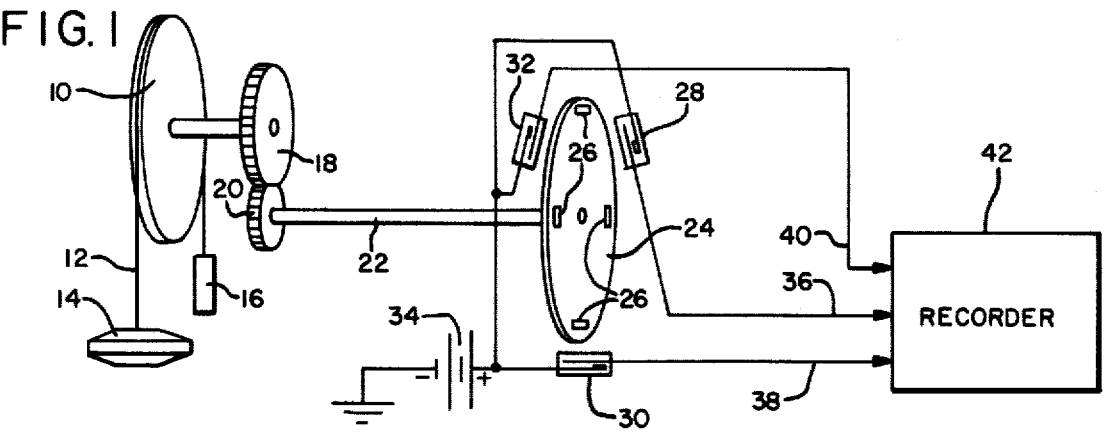
FIG. 1 is a diagrammatic view of one embodiment of a shaft position encoder apparatus used for the recorder of the present invention.

As shown in FIG. 1 a shaft position recorder apparatus in accordance with the present invention may be used as a liquid level recorder which employs a float pulley 10 to rotate a shaft encoder supplying the input signal to such recorder. The float pulley 10 is rotated by a line 12 attached at one end to a float 14 and at its other end to a counter weight 16. The float moves with the liquid level and rotates the pulley. The shaft of the float pulley 10 is connected by gears 18 and 20 to the shaft 22 of a shaft position encoder. The shaft position encoder includes a support disk 24 connected to shaft 22 and having four permanent magnets 26 mounted at positions spaced equally about the circumference of such disk in position to actuate three equally spaced reed switches 28, 30 and 32 surrounding such disk. Each of the reed switches includes two electrical contacts which are closed by the magnets when they are moved adjacent thereto. One of the switch contacts is connected in common to the positive terminal of a DC voltage source 34. The other switch contact of each of the reed switches 28, 30 and 32 is connected to a different one of three output conductors 36, 38 and 40 which are connected as parallel inputs to a recorder circuit 42. The recorder circuit 42 may be either the analog comparator embodiment shown in FIG. 3 or the digital computer embodiment shown in FIG. 4.

Figure 2:
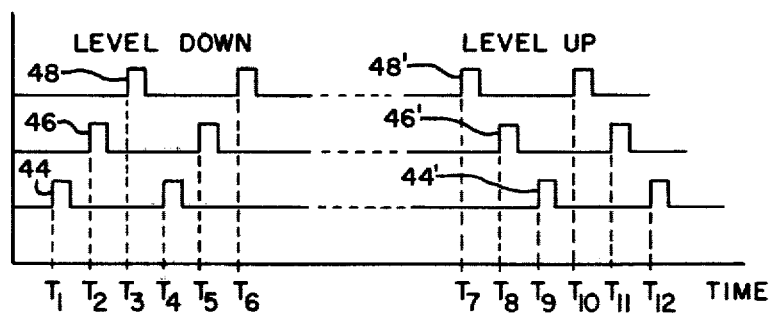
FIG. 2 is a diagrammatic view showing the electrical signals produced by the switches in the encoder of FIG. 1.

As shown in FIG. 2, when the liquid level is falling so that float 14 moves downward, the support disk 24 and the shaft 22 rotate clockwise closing the contacts of the first switch 28, the second switch 30 and the third switch 32 in the sequence named. This causes switches 28, 30 and 32 to produce pulses 44, 46 and 48 respectively on the output conductors 36, 38 and 40 respectively. However, when the water level rises and float 14 moves upward the support disk 24 rotates in a counter clockwise direction. This causes the contacts of the third switch 32, the second switch 30 and the first switch 28 to be closed in the sequence named and to produce pulses 48', 46' and 44', respectively. Thus, it can be seen that the sequence in which the three switches are operated indicates whether the liquid level is going up or down from the previous level. It should be noted that when the liquid level is going down the switch closing sequence can, of course, be switches 30, 32 and 28 or switches 32, 28 and 30 as well as the above described sequence of switches 28, 30 and 32, since all three of these sequences indicate that the support disk 24 is rotating in a clockwise direction and the float is falling. Similarly, when the liquid level is going up the switch closing sequence can be switches 28, 32 and 30 or switches 30, 28 and 32, as well as the above described sequence of switches 32, 30 and 28, since all of these sequences indicate that the support disk 24 is rotating in a counter clockwise direction and the float is rising.

One complete rotation of the support disk 24 defines six increments of liquid level change which means that each switch will be operated six times. This is because there is an angle of 90° C. between each of the four magnets and there is an angle of 120° C. between each of the three switches. Therefore, there is a space of 30° C. between each of the three output pulses 44, 46 and 48 so that one complete sequence of three pulses requires the disk 24 to rotate 60° C. As a result there are six sets of switch closures and six groups of pulses for each 360° C. of rotation of the disk 24. In the preferred example, each measured increment of liquid level corresponds to a change of 0.01 foot, since there are six increments possible for each complete revolution of disk 24, one complete revolution of the disk corresponds to a change in liquid level of 0.06 foot.

Figure 3:
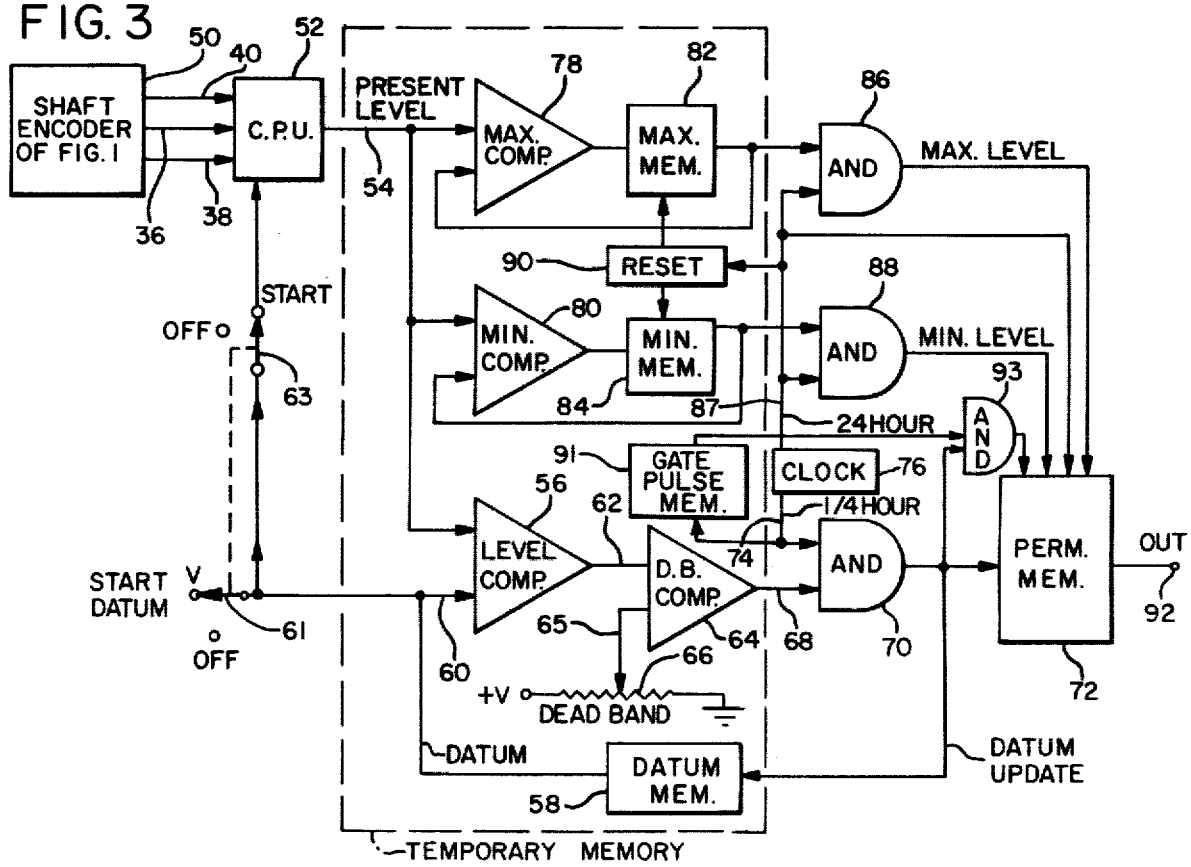
FIG. 3 is a block diagram of the electrical circuit of one embodiment of a liquid level recorder in accordance with the present invention.

As shown in FIG. 3 one embodiment of the liquid level recorder apparatus and method of the present invention includes a shaft position encoder 50 which may be like the encoder 24, 26, 28, 30 and 32 of FIG. 1. The three output conductors 36, 38 and 40 of the shaft encoder are connected to the inputs of a central processing unit 52 of a digital computer which analyzes the pulses 44, 46 and 48 of each group of pulses supplied by the encoder to determine from their sequence whether the change in liquid level is up or down compared to the previously measured level. A present level signal whose amplitude corresponds to the magnitude of the presently measured liquid level, is produced at the output 54 of the C.P.U. 52. The output of the C.P.U. 52 is connected to one input of a first comparator 56 which may be a differential amplifier circuit. The other input of the comparator 56 is connected to the output of a datum memory 58 which stores the previous level signal and applies a corresponding datum reference signal to such comparator at reference input 60. The comparator 56 compares the present level signal with the datum reference signal and produces a difference signal at its output 62 corresponding to the difference in amplitude between such present level signal and the datum reference signal.

The difference signal on conductor 62 is applied to one input of a second comparator 64 which may be a switching amplifier circuit. The other input 65 of such comparator is connected to a source of adjustable DC voltage at the movable contact of a variable resistance potentiometer 66 connected between a positive DC voltage source and grounded. As a result the second comparator 64 only produces an output difference signal at its output 68 when the difference signal on input 62 exceeds a predetermined DC voltage called a "dead-band" voltage on the movable contact 65 of the potentiometer 66.

The output difference signal on the comparator output 68 is transmitted through an And gate 70 to a permanent electronic memory 72 periodically when such And gate is rendered conducted by a gating pulse applied to gate input 74 by a clock pulse generator 76. At the same time the output difference signal is also transmitted from the output of the And gate reference signal stored in such datum memory which is applied to input 60 of the first comparator. Thus, the timing of the gate pulse on input 74 and the width of the gate pulse determines when the And gate 70 is rendered conducting to conduct the output difference signal at the output 68 of the deadband comparator 64 to the memory 72. The time interval between the gate pulses can be adjusted, but typically is on the order of fifteen minutes so that four clock pulses are applied to the And gate 70 every hour at fifteen minute intervals to transmit an output difference signal to the permanent memory only when the difference signal at input 62 exceeds the deadband voltage at input 65. If the difference signal at input 62 does not exceed the deadband voltage at input 65, the deadband comparator 64 does not switch and does not produce an output difference signal at output 68. This results in a considerable reduction in the amount of data which must be stored in the memory 72 and greatly reduces the required size of such memory.

The present level signal output 54 of the C.P.U. 52 is also connected to one of the inputs of a maximum level comparator 78 and a minimum comparator 80. The other input of the maximum comparator 78 is connected to the output of a maximum memory circuit 82 while the other input of the minimum comparator 80 is connected to the output of a minimum memory circuit 84. The maximum level memory 82 and the minimum level memory 84 have their inputs connected respectively to the outputs of the maximum comparator 78 and the minimum comparator 80. As a result, the maximum comparator 78 and the minimum comparator 80 continuously monitor the maximum and minimum levels of the present level signal at the output 54 of the central processing unit. If the maximum level of the present level signal exceeds the previous maximum level stored in the maximum memory 82, the maximum comparator 78 switches and produces a difference signal output corresponding to the difference signal between the two compared maximum levels. The maximum level difference signal is added to the previously stored maximum level signal in the maximum memory 82 to produce a new stored maximum level at the output of such memory. The stored maximum level is transmitted from the maximum memory 82 through an And gate 86 to the permanent memory 72 when such And gate is rendered conducting by another gating pulse produced by the clock pulse generator 72 at its output 87 at the end of a predetermined time period such as once every 24 hours at midnight.

Similarly, the minimum level comparator 80 continuously compares the present level signal at output 54 of the C.P.U. with the previously stored minimum level signal in the minimum memory 84 and produces a difference signal at its output when such present level signal falls below the stored minimum level signal. The minimum level difference signal at the output of comparator 80 is then added to the previously stored minimum level signal in the minimum memory 84 to produce a new stored minimum level at the output of such memory. This stored minimum level signal is transmitted through a second And gate 88 to the permanent memory 72 when such And gate is rendered conducting by the 24 hour gating pulse supplied by the clock 76. It should be noted that when the 24 hour gate pulse terminates it triggers a reset pulse generator circuit 90 to reset the maximum memory and minimum memory to the last level reading at midnight.

The permanent memory 72 is provided with an output 92 which can be connected to an indicating device, such as a digital display, or to a utilization device, such as a punched tape recorder, to record the data stored in such permanent memory on punched paper tape. A start datum switch 61 momentarily connects the data reference input 60 of the level comparator 56 to a predetermined DC voltage source V at the start of recording when there is nothing stored in the datum memory 58. Another start datum switch 63 which is ganged to switch 61 momentarily connects the C.P.U. 52 to the voltage source V as a reference at the start of recording for the memory of the C.P.U. where the present level signal is stored.

The 24 hour pulse on clock output 87 is also transmitted to the permanent memory 72 for storage to indicate the day on which the level readings were taken. Similarly the 15 minute gate pulses on clock output 74 are also recorded in the permanent memory after such gate pulses are temporarily stored in a temporary gate pulse memory 91 and transmitted through another And gate 93 whose second input is connected to the output of the deadband comparator gate 70. This enables the 15 minute gate pulses which occur when there is no output difference signals at the output 68 of the deadband comparator, to be transmitted as one timing signal to the permanent memory and reduces the required size of such memory.

The shaft position recorder apparatus is shown in FIGS. 1 to 3 and in the digital computer embodiment hereafter described with reference to FIG. 4, as being used for a liquid level recorder. However, it should be appreciated that such shaft position recorder apparatus can be used to record other sources of data, such as automobile traffic or chemical processes including temperature changes and the like. In any of these applications the shaft position recorder apparatus and method of the present invention has the advantage that it operates much more efficiently because only the periodic difference in the shaft position is transmitted to the permanent memory for storage and such difference is only so transmitted when such difference signal exceeds a predetermined deadband. Therefore, the information stored in the permanent memory is greatly reduced and the size of such memory required for storage is also reduced. It should be noted that the time intervals between the reed switch pulses 44, 46, and 48 of FIG. 2 are not the same but vary in width with changes in the speed of rotation of support disk 24 with the rate of change of the liquid level.

As shown in FIG. 4, a digital computer programmed in accordance with the method of the present invention includes the following operation logic steps. First the sequential output pulses transmitted from the reed switches of the shaft encoder to the input of the computer are analyzed and counted to produce a present level signal as shown in logic block 94. Then the present level signal is compared with a datum reference signal stored in a temporary memory in the computer to produce a net change or level difference signal, as indicated by logic block 96. Next, the computer asks whether a recording time interval has elapsed as shown in block 98. If the answer is YES, then the computer asks whether it is midnight as shown in block 100. If the answer is NO, the computer then is asked whether a deadband reference voltage was selected as shown in block 102. If the answer to the latter question is NO, then the net change or difference signal is written directly into the permanent memory, as shown by block 108. However, if the answer to the question in block 102 is YES, then the computer asks whether the net change or level difference is greater than the deadband as indicated by block 104. If the answer to this question is NO, then the computer skips the reading and does not record it, as shown in block 106. However, if the answer to the question in block 104 is YES, then the net change or level difference is written into the permanent memory as shown by block 109 as is the number of 15 minute time intervals which have expired since the last YES output of block 104. In addition, a datum update command is transmitted from the yes output of block 104 to the block 96 to update the datum reference stored in the temporary memory by adding the level difference thereto when the level difference is greater than the deadband.

As shown in FIG. 4, the computer is also programmed to continuously monitor the present level signal produced in block 76 to determine its maximum and minimum amplitudes. Thus, the computer is programmed to ask if the amplitude of the present level signal is greater than the previously stored maximum signal as shown in block 110. If the answer is NO, then the level is skipped and not stored as shown in block 112. However, if the answer is YES, the level is stored as a new maximum level in the maximum level temporary memory as shown in block 114. Similarly, the computer is programmed to ask if the present level signal has an amplitude which is less than the previously stored minimum level as shown in block 116. If the answer to the question is NO, then the level reading is skipped and not stored as indicated by the block 112. However, if the answer is YES, then the new minimum level is stored in the minimum level temporary memory as shown in block 118. At the end of each 24 hour period at midnight, the logic block 100 produces a YES output which causes the levels stored in the maximum level temporary memory and the minimum level temporary memory as a result of the operation of blocks 114 and 118, to be recorded in the permanent memory along with the 24 hour pulse as indicated by block 120. This completes one cycle operation of the method of recording liquid level changes in accordance with the present invention.

It will be obvious to those having ordinary skill in the art that many changes may be made in the details of the above described preferred embodiment of the present invention without departing from the spirit of the invention. Therefore, the scope of the present invention should only be determined by the following claims.

What is claimed is:

1. Recorder apparatus, comprising:
   input means for supplying a group of electrical pulses for each measured change in a variable quantity so that the sequence of the pulses in said group indicates whether said change was an increase or decrease from the previous reading;
   signal processing means connected to said input means, for processing each group of pulses and producing a present measured value output signal corresponding to the value of the measured variable quantity;
   first memory means having one input connected to the output of said signal processing means for comparing said present value signal with a reference datum signal on another input corresponding to a previous measured value signal stored in a storage means in said first memory means to produce a difference signal at its output;
   second memory means for recording and storing said difference signal;
   first gate means for transmitting said difference signal from the first memory means to said second memory means in response to a gate pulse applied to said first gate means for a time interval corresponding to the width of the gate pulse; and
   feedback means for transmitting said difference signal from the output of said gate means to said storage means to update said reference datum signal and for transmitting said reference datum signal from said storage means to the other input of said first memory means.

2. A recorder in accordance with claim 1 in which the first memory means also includes a deadband means for comparing a predetermined deadband signal of adjustable magnitude to said difference signal so that said first memory means only produces a difference output signal only when the difference between said present position signal and said reference signal exceeds said deadband.

3. A recorder in accordance with claim 1 in which the input means is a shaft encoder and the measured change is a change in the shaft position of said encoder.

4. A recorder in accordance with claim 2 in which the deadband means transmits the difference output signal through the first gate means to the second memory means only during said gate pulse.

5. A recorder in accordance with claim 1 which also includes maximum memory means for storing a maximum measured value and minimum memory means for storing a minimum measured value of the present value signal produced during a predetermined time period, and second gate means for transmitting a maximum value signal and a minimum value signal from said maximum and minimum memory means to said second memory means in response to a period gate pulse at the end of said time period.

6. A recorder in accordance with claim 5 in which the period gate pulse applied to said second gate means is produced by a clock pulse generator means which also supplies the gate pulses to said first gate means with a greater frequency than the period gate pulses.

7. A recorder in accordance with claim 5 in which the maximum and minimum memory means are reset to the present measured value after said period gate pulse is applied to said second gate means.

8. A recorder in accordance with claim 1 used to record liquid level in which the input means supplies said group of pulses for each measured change in the level of a liquid and the measured change is a change in liquid level so that the sequence of the pulses indicates whether the change in level was up or down from the previous level.

9. A liquid level recorder in accordance with claim 8 in which the input means is a shaft encoder means including at least three magnetically operated switches and magnet means for switching said switches in different sequence depending upon whether the liquid level is rising or falling.

10. A method of recording the level of a liquid including the steps of:
    producing a group of electrical pulses for each measured change in the level of a liquid so that the sequence of the pulses in said group indicates whether said change in level was up or down from the previous level;
    processing each group of pulses to produce a present level signal corresponding to the measured liquid level;

comparing said present level signal with a stored reference level signal corresponding to the previous level signal to produce a difference level signal;

periodically gating said difference level signal to transmit a gated difference level output signal to an output memory for storage; and adding said gated difference level signal to said reference level signal to produce a new reference level signal and storing said new reference level signal for comparison with the next level signal.

11. A method in accordance with claim 10 which also includes the step of comparing a predetermined deadband signal to said difference level signal to provide said gated difference level output signal only when the difference level signal amplitude exceeds said deadband signal.

12. A method in accordance with claim 10 which includes the step of comparing a predetermined deadband reference signal to said difference level signal to provide said gated difference output signal only when the difference signal amplitude exceeds said deadband signal at the end of a predetermined time interval.

13. A method in accordance with claim 10 which also includes the steps of storing in a temporary memory means the maximum level and minimum level of the present level signal produced during a predetermined time period, and gating the output of said temporary memory means to transmit said stored maximum level and minimum level signals to the output memory at the end of said period for more permanent storage.

14. A method in accordance with claim 13 which also includes resetting the temporary memory means to their quiescent values after gating their outputs to the output memory.

15. A method in accordance with claim 10 in which the group of pulses is produced by rotating a shaft in response to changes in the liquid level and switching electrical switches by said shaft rotation.

* * * * *